UNITED STATES PATENT OFFICE.

JEAN EFFRONT, OF BRUSSELS, BELGIUM.

FERMENTATION OF MATERIALS WHICH HAVE BEEN RENDERED ASEPTIC.

SPECIFICATION forming part of Letters Patent No. 620,022, dated February 21, 1899.

Application filed October 12, 1896. Serial No. 608,603. (No specimens.)

*To all whom it may concern:*

Be it known that I, JEAN EFFRONT, of Brussels, in the Kingdom of Belgium, have invented a new and useful Method for the Fermentation of Materials which have been Rendered Aseptic, (for which I have obtained patents in Great Britain, No. 4,598, dated March 4, 1895, and No. 8,123, dated April 24, 1895,) of which the following is a specification.

This invention is an improvement upon the process of fermentation disclosed in Letters Patent of the United States No. 478,418, dated July 5, 1892. The characteristic features of the process of fermentation set forth in the said patent are, first, the subjection of the raw material entering into the manufacture of syrups, sugar, alcohol, beer, pressed yeast, &c., to the action of fluorin compounds, whereby such materials are rendered aseptic, and, secondly, in connection with such manufacture the preparation and employment of yeast which has been treated with fluorin compounds.

The present invention is based upon the observed fact that the fermenting power of yeast is to some extent lessened by the presence of an antiseptic, and upon the further observation that by a system of progressive cultivation with gradually-increasing proportions of an antiseptic a yeast may finally be produced which will retain its full fermenting power and will not be injuriously affected by the antiseptic employed to render aseptic the worts or raw material into which the yeast is introduced, provided the antiseptic employed to render the worts aseptic is the same as the antiseptic employed in the preparation of the yeast.

The present invention therefore embraces, essentially, the production of a yeast possessing the capacity of resisting the injurious effect of the antiseptic, which will be employed in rendering the worts aseptic. I have found that the best results are obtained when the yeast has been progressively cultivated until the percentage of antiseptic employed in its latest propagation is greater than the percentage of antiseptic introduced into the worts to be fermented. A yeast capable of resisting a certain amount of antiseptic will not only resist in a wort containing a smaller amount of the same antiseptic, but will exert therein its full fermenting power. Hence the characteristic feature of the present improvement consists in the employment of yeast so cultivated as to bear an amount of antiseptic greater than that introduced into the wort which is to be fermented. Preferably hydrofluoric acid is employed as the antiseptic; but other antiseptics may be employed, if desired—as, for example, salicylic acid, picric acid, formic aldehyde, and others.

The resulting action of yeast cultivated as herein set forth will correspond to that which ensues in working by means of a good yeast a wort which has not been rendered antiseptic, but which is free from all disease ferments. In other words, the maximum yield of alcohol will thus be obtained.

The progressive cultivation of the yeast is performed by a series of steps, the first of which is conducted as follows: Into a wort of malted grain of a density of, say, 10° Baumé previously submitted to saccharification in the ordinary manner is introduced an antiseptic, preferably hydrofluoric acid in the proportion of 0.02 grams of acid to one liter of the mash, or an equivalent amount of any suitable fluorid may be employed instead of the hydrofluoric acid. Ordinary beer-yeast is then added in the proportion of ten grams to one liter of the saccharified mass and the whole left to fermentation until the density of the wort has been reduced from 10° Baumé to 5° Baumé. The yeast is then collected on a filter, constituting the yeast of the first step. The operation is repeated by adding the yeast thus obtained to a new quantity of wort of 10° Baumé, into which has been introduced hydrofluoric acid in the proportion of 0.03 grams of acid to one liter of the mash or an equivalent amount of a suitable fluorid. When, by the ensuing fermentation, the density has been reduced to 5° Baumé, the yeast is again collected on a filter, constituting the yeast of the second step. The yeast of the second step is then introduced into a new quantity of wort of 10° Baumé, to which is added hydrofluoric acid in the proportion of 0.04 grams of the acid to one liter of the mash. When, by fermentation, the density of the wort has been reduced to 5° Baumé, the yeast is collected on a filter, constituting the yeast of the third step. This process is continued and the operation repeated, increasing with each operation the proportion of hydrofluoric acid by 0.01 grams to the liter, until at the last the yeast is propagated in a wort containing one gram of hydrofluoric acid to the liter. If this step is accomplished, it is desirable to propagate the yeast with the same dose of antiseptic for several weeks. While in the operation at first it will take three days before the density will be reduced to 5° Baumé, after a few more propagations this will be obtained in six to eight hours. When this effect has been obtained, the yeast is considered as being sufficiently acclimatized to the antiseptic and the process is terminated.

It is to be understood that in conducting the progressive cultivation of the yeast it is not essential to employ the exact proportions of hydrofluoric acid specified and that the desired result will be produced by employing any minute proportion of hydrofluoric acid in the preparation of the yeast of the first step and by gradually increasing the quantity of hydrofluoric acid employed in the preparation of the yeast of the succeeding steps.

The yeast thus cultivated is susceptible of useful employment in the fermentation of any raw material, either amylaceous or saccharine, from which alcohol is to be manufactured and which has been rendered aseptic by treatment with hydrofluoric acid or other antiseptic which has been employed in the cultivation of the yeast, and hence the term "worts" is herein used as a designation for the prepared raw material of any kind from which alcohol is to be manufactured.

The yeast thus obtained can be used when it has been prepared and propagated indefinitely; but it is not possible to transport it far away from the place where it has been prepared or to keep it intact for some time without continuous propagation. To obtain this aim and to make the present invention more valuable, the yeast must be submitted to a special treatment, which must therefore be considered as being the second stage in the manufacture of the acclimatized yeast. This treatment, to be described hereinafter, is based on the fact found by me that even after desiccation the yeast hereinbefore described will preserve its fermenting power and is in this dry condition transportable and can be kept as long as desired.

The yeast, acclimatized in a grain wort containing the maximum of antiseptic, is separated from the liquid by being filtered through a paper filter or a filter-press. The residue containing the yeast is pressed and molded into cakes. These cakes are placed in a heated chamber or incubator, in which a vacuum is produced and in which a temperature of about 35° centigrade is maintained. After the cakes of yeast have been exposed for five or six days to this treatment it will be ascertained that the yeast has formed spores. The temperature of the heated chamber is then increased to 45° centigrade, always maintaining the vacuum. After remaining for five or six days more in this atmosphere the cakes are almost entirely dry and furnish in this state the very stable active yeast, preserving the great fermenting power of the acclimatized yeast, forming a commercial and salable product, which can be sent everywhere and preserved as long as desired. For use in industrial fermentation the yeast is propagated from these dried cakes in the manner well known to every professional man. In this propagation an amount of antiseptic slightly smaller than that to which the yeast has been acclimatized is added to the wort. If, for instance, the yeast has been acclimatized to one gram of hydrofluoric acid in the liter of wort, only 0.8 grams to the liter will be taken for this propagation.

It will be seen from the foregoing that the question is principally as to a process having for its object the habituating of the yeast to stand antiseptic doses progressively stronger and this with a view to forming cells of great vigor—that is to say, the yeast, while continuing to be nourished, is only multiplied in small proportion. For example, in ordinary culture in grain wort the yeast multiplies in the proportion of one to twenty—i. e., one cell gives twenty cells. In the antiseptic wort, on the contrary, one cell gives one cell, but of a very great vigor and of a much more virile action than the twenty cells of the ordinary yeast in such manner that a very little yeast can ferment a large proportion of sugar in very little time. From this the following advantage results—that is to say, ordinary yeast having rapidly multiplied a large number of cells produces in the wort a large proportion of glycerin and of succinic acid to such a degree that these substances prevent fermentation in less than five per cent. of the fermentable matter, which consequently disappears in the drainage without being utilized for production of alcohol. On the contrary, the yeast but slightly multiplied gives an insignificant quantity of glycerin and of succinic acid, so that the loss of fermentable matter is at most from one-tenth to two-tenths per cent.

Now I desire to have it understood that this process of acclimation can be effected by the aid of any suitable antiseptic, and the treatment for the acclimation is the same in principle for all the antiseptics as for that described for fluorin—that is to say, all the operations and quantities remain the same and only the proportions of the antiseptics change by reason of the more or less energetic action in acclimation. Thus it is that, as described in the specification, I use in the first step of preparation 0.1 gram of fluorin and increase this proportion by one-tenth of a gram for each step following up to one gram. For formic aldehyde I first use 0.2 of one gram, then 0.4, and so on up to two grams. For picric acid I use for the first step 0.25, then 0.50 up to 2.5 grams. For salicylic acid I first use 0.4, then 0.8, and so on up to four grams. All of these agents are used without any other change in the process. The process thus remains the same throughout the whole series of agents, and only the proportion of the antiseptic is changed according to its energy.

What is claimed as the invention is—

1. The herein-described process of preparing yeast, which consists in introducing a yeast into a wort containing a given quantity of antiseptic and propagating it therein; then taking the yeast thus produced and introducing it into another quantity of wort containing a greater proportion of antiseptic and propagating it therein; and so on, introducing each new yeast produced into worts of increasing proportions of antiseptic until the desired yeast is obtained, substantially as herein described.

2. The herein-described process of preparing yeast, which consists in introducing a yeast into a wort containing a given quantity of antiseptic and propagating it therein; then taking the yeast thus produced and introducing it into another quantity of wort containing a greater proportion of antiseptic and propagating it therein; and so on, introducing each new yeast produced into worts of increasing proportions of antiseptic until the desired yeast is obtained, then separating the yeast from the liquid pressing it and drying it under vacuum, at first at 30° centigrade and then at 45° centigrade, substantially as described.

3. The herein-described process for the fermentation of a wort which has been rendered aseptic, which consists in the employment in such wort of yeast produced by successive cultivation in a series of worts containing progressively increasing proportions of an antiseptic and which has been finally propagated in a wort containing a larger proportion of antiseptic than that employed in rendering aseptic the wort which is to be fermented.

JEAN EFFRONT.

Witnesses:
 AUG. JOERISSEN,
 E. PARETTE.